Jan. 25, 1966   H. G. WERNER ETAL   3,231,350
METHOD AND APPARATUS FOR DRAWING SHEET GLASS
Filed Sept. 13, 1961   3 Sheets-Sheet 1

INVENTORS
Henry G. Werner and
BY Laurence F. Wilson

Nobbe & Swope
ATTORNEYS

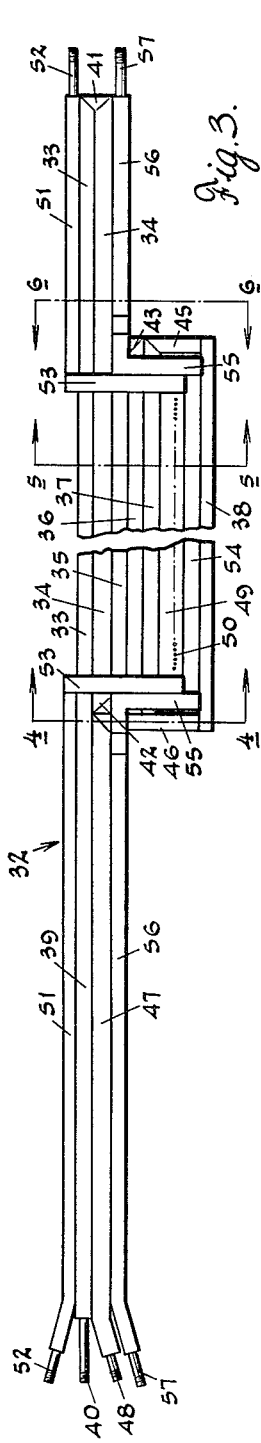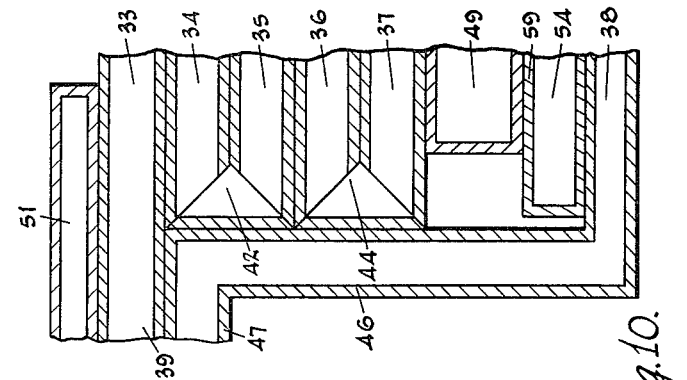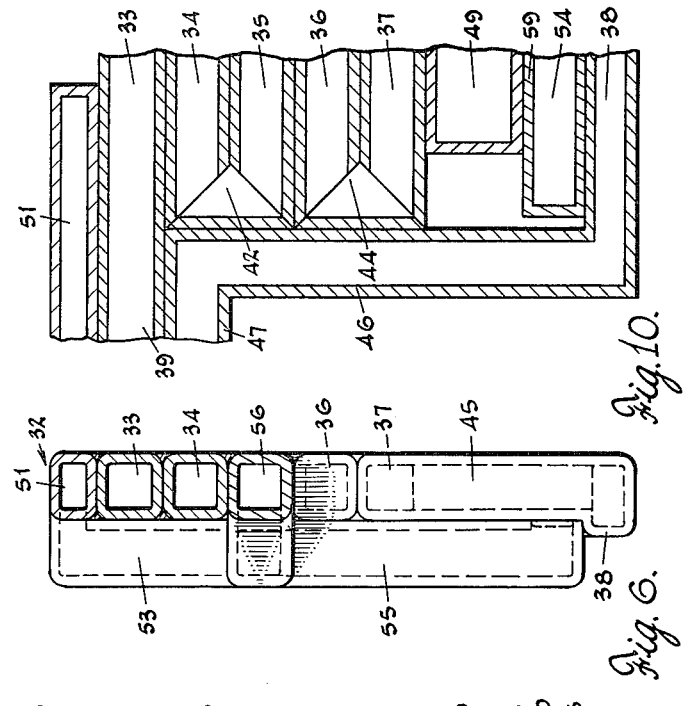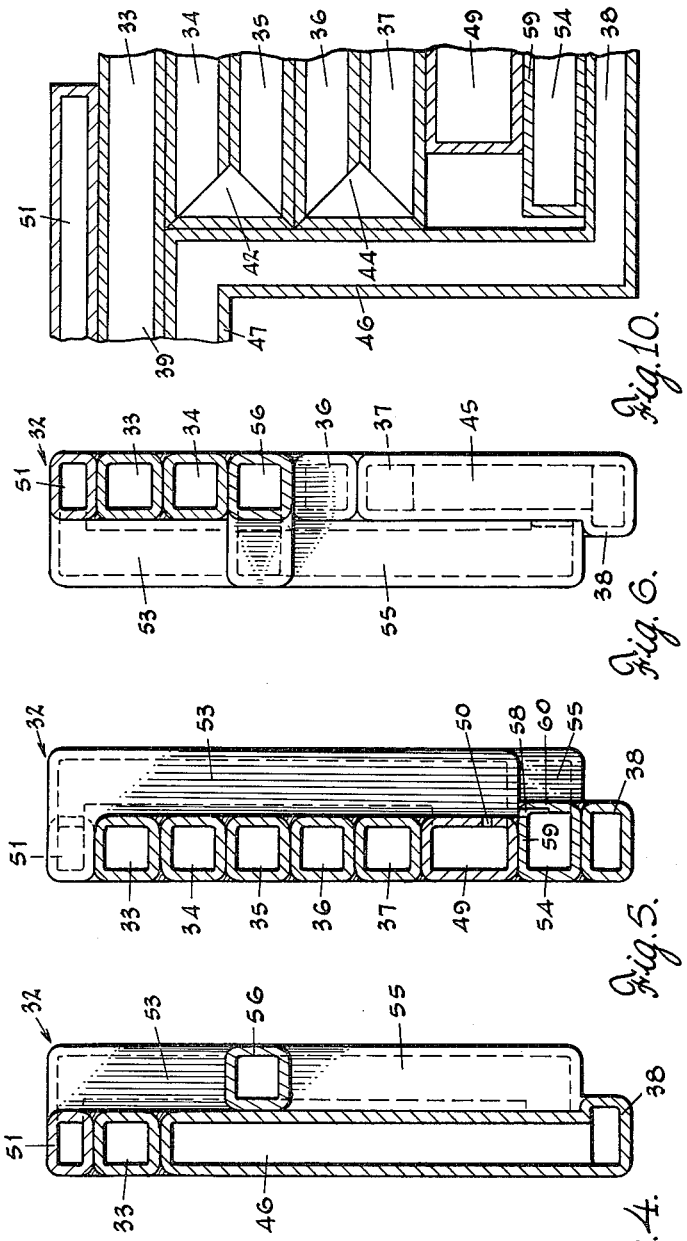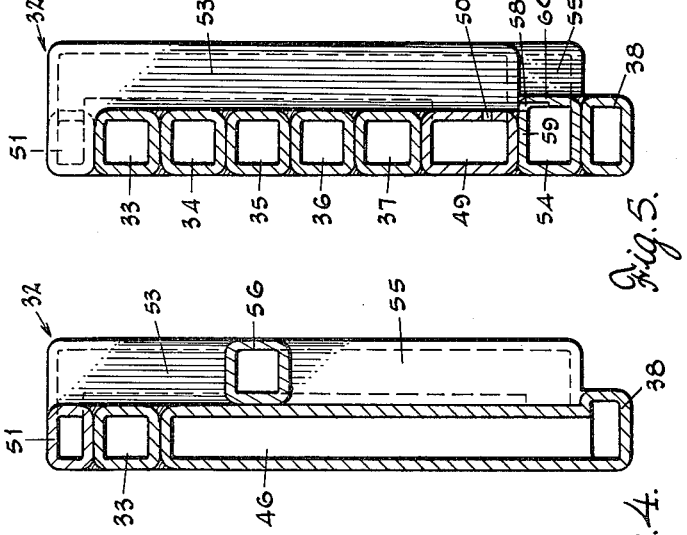

INVENTORS
Henry G. Werner and
BY Lawrence F. Wilson

Nobbe & Swope
ATTORNEYS

United States Patent Office 3,231,350
Patented Jan. 25, 1966

3,231,350
METHOD AND APPARATUS FOR DRAWING SHEET GLASS
Henry G. Werner and Lawrence F. Wilson, both of Toledo, Ohio, assignors to Libbey-Owens-Ford Glass Company, Toledo, Ohio, a corporation of Ohio
Filed Sept. 13, 1961, Ser. No. 137,839
8 Claims. (Cl. 65—83)

This invention relates broadly to the production of sheet glass and more particularly to an improved method and apparatus for controlling the temperature of the glass sheet and the atmosphere surrounding the sheet in the zone of sheet formation.

According to several well-known methods of forming sheet glass, a ribbon or sheet of glass is drawn upwardly from a bath of molten glass in the drawing chamber of a continuous melting furnace, the glass sheet emerging from the meniscus formed at the surface of the molten glass. The drawn sheet may then continue upwardly into a vertical tower or lehr at the top of which it is cut to appropriate size, or it may be bent about a horizontal bending roll within the drawing chamber and thereafter advanced along a substantially horizontal plane through an annealing lehr. Upon its emergence from the lehr, the edges of the cooled, continuous sheet are removed and it is cut into smaller sheets of appropriate size.

Since such vertically drawn sheet glass is intended to be used without further processing, as by grinding and polishing the surfaces thereof, it is extremely important that the sheet be free from the so-called "waviness" caused by variations in the thickness of the sheet. It has been found that in order to make distortion-free sheet glass by this process, it is necessary to minimize local temperature variations or fluctuations within and around the glass in the zone of sheet formation. Such local variations in temperature in the vicinity of the meniscus cause waves, or alternate thick and thin portions running longitudinally of the vertically rising sheet. The longitudinal waves or thickness variations, in turn, cause distortion which is highly objectionable from an optical standpoint, particularly when objects are viewed through the glass at a sharp angle to the waves.

Many devices have been proposed to assure that the molten glass arriving in the vicinity of the meniscus is uniform in temperature and viscosity. Still other devices have been proposed for providing a quiescent atmosphere above the molten glass in the drawing chamber surrounding the newly formed sheet to thereby reduce distortion. It has also been found advantageous to initially cool and solidify the sheet within the drawing chamber by locating sheet coolers in opposed relation to either surface of the sheet somewhat above the meniscus to absorb heat from the sheet by radiation, thus making possible the drawing of a sheet of uniform thickness at a relatively high speed. Such coolers, however, while conditioning or solidifying the sheet, also tend to set up undesirable convection currents within the drawing chamber. As the air or other gas within the drawing chamber contacts the surface of the coolers, it is cooled and thus tends to descend toward the surface of the molten glass around the meniscus. The cooled gases are then reheated by direct contact with the molten glass and are caused to rise along the surface of the vertically rising sheet by the chimney effect created in that area. This air movement at the base of the sheet in the vicinity of the meniscus creates uneven cooling across the width of the sheet, thereby causing thickness variations, or waviness, in the sheet running parallel to the direction in which it is being drawn.

Briefly stated, the surfaces of the sheet coolers tend to create a boundary layer of cool air adjacent thereto. As the air cools, it moves downwardly toward the meniscus from which the sheet is being drawn where, unless inhibited, it will come in contact with the viscous glass and cause thickness variations in the sheet. According to the present invention, the formation of this cool boundary layer is prevented by directing a layer of heated gases of combustion upwardly over the surfaces of the coolers from manifolds located in the lower portion of the coolers.

It is an object of the present invention to provide a novel method and apparatus for accurately and uniformly cooling the sheet in the forming zone by reducing or eliminating the downward movement of cooled gases adjacent the sheet coolers.

Another object of the present invention is to provide, in sheet coolers of the above character, a continuous flame across the lower portion of said coolers.

Another object of the present invention is to provide in sheet glass forming apparatus, an upwardly moving layer of hot combustion gases adjacent the surfaces of the sheet coolers opposite the sheet.

Another object of the invention is the provision, in sheet glass forming apparatus, of sheet coolers wherein the surfaces thereof facing the sheet are covered by a layer of hot gases of combustion, and the coolers themselves provide the air necessary to support the combustion of the gas in the lower portion of the coolers.

Still another object of the invention is the provision of sheet glass forming apparatus of the above character in which the air for mixing with the combustible gases is directed upwardly along the surfaces of the coolers so as to cause the flames to create a slowly rising sheet of hot gases covering the surfaces of the coolers and to thus prevent the air in the zone of sheet formation from coming in contact with the coolers.

Other objects and advantages of the invention will become more apparent during the course of the following description, when taken in connection with the accompanying drawings.

In the drawings, wherein like numerals are employed to designate like parts throughout the same:

FIG. 3 is a front elevational view of a sheet cooler with part of the center portion removed, and showing the means for connecting the cooler to air, gas and cooling medium supplies;

FIG. 4 is an enlarged sectional view taken substantially on line 4—4 of FIG. 3;

FIG. 5 is an enlarged sectional view taken substantially on line 5—5 of FIG. 3;

FIG. 6 is an enlarged sectional view taken substantially on line 6—6 of FIG. 3;

FIG. 10 is a fragmentary sectional view of the other end of the cooler taken substantially on line 10—10 of FIG. 8.

Figure 1:
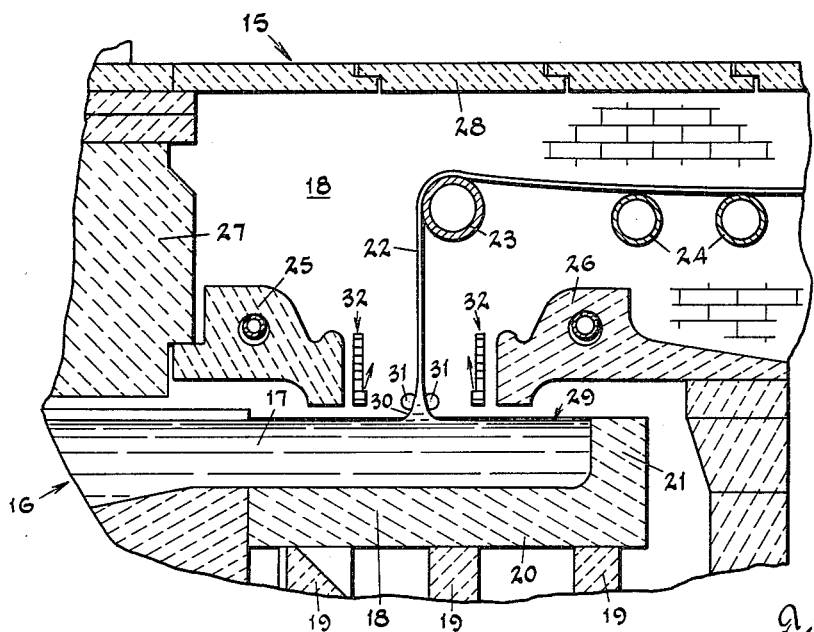
FIG. 1 is a longitudinal vertical sectional view through a sheet glass drawing apparatus, showing associated therewith the novel apparatus for accurately and uniformly cooling the sheet in the forming zone by reducing or eliminating the downward movement of cooled gases adjacent the sheet coolers.

With reference now to the drawings and particularly to FIG. 1, there is shown a machine for making sheet glass according to the so-called Colburn process. The furnace represented in its entirety by the numeral 15, has a cooling chamber 16 through which the molten glass 17 flows into a relatively shallow working receptacle or draw pot 18 of conventional construction. The draw pot 18 is supported on stools 19 within the heating chamber surrounding the draw pot and includes a floor 20 and walls 21 of refractory material. The heating chamber may be heated in any desired manner as, for example, by gas burners (not shown) to maintain the molten glass within the draw pot at the desired temperature.

A sheet of glass 22 is continuously drawn upwardly from the surface of the molten glass 17 within the drawing chamber 18, and while still in a semiplastic condition although substantially set in its final sheet form, is deflected into a horizontal plane about a bending roll 23. Thereafter, the sheet is supported and carried forward toward a suitable annealing lehr (not shown) upon a series of horizontally aligned machine rolls 24.

The standard Colburn machine includes the liptiles 25 and 26 and the cooling chamber exit arch 27 positioned to protect the rising sheet 22 from blasts of hot air and gases of combustion from the melting end of the furnace and from the chamber surrounding the draw pot. To further insure a quiescent atmosphere in the zone of sheet formation, the drawing chamber is enclosed by side walls and a roof or cover 28.

That area of the drawing chamber 18 which is disposed generally below the bending roll 23 and between the liptiles 25 and 26 is the area referred to herein as the zone of sheet formation, and within this zone is the exposed surface of the molten glass in the draw pot, as well as the newly-formed sheet 22. As the sheet or ribbon of glass is drawn upwardly from the surface 29 of the molten glass, a meniscus or enlarged base portion 30 is first created, and the meniscus then pulls progressively thinner and thinner as it moves upward until the sheet becomes substantially set some distance above the molten bath, the glass sheet by this time having lost sufficient plasticity to attain its final thickness. Width maintaining rolls 31 positioned at either edge of the sheet operate in the usual manner to maintain the sheet at the desired width and overcome its natural tendency to narrow to a thread.

As is well known, the thickness of a finished sheet that has been drawn from a bath of molten glass in this, or any of the other conventional machines, is determined largely by the viscosity of the glass during the formative period and the speed at which the sheet is drawn. Since the viscosity of the glass is determined by its temperature, it will be apparent that when the temperature across the sheet in the zone of formation is not constant, corresponding variations in the thickness of the sheet as earlier described will result. This is true because in areas where relatively cool air strikes the unset glass, it will chill, or set up, more rapidly and so will be thicker at this point, while areas that are subjected to excessively heated air will continue to attenuate or grow thinner beyond the normal setting-up point.

To overcome this variation in temperature in the zone of sheet formation, as well as to cool the newly-formed sheet more rapidly and thereby make possible an increase in the drawing speed of the sheet, coolers 32 are positioned in the spaces between the liptiles 25 and 26 and the surfaces of the sheet. These coolers 32 are disposed adjacent the rising glass sheet so as to absorb heat therefrom as well as to establish an atmospherically tempered zone through which the sheet must pass during the very critical period of its formation when the glass is viscous or has not become set in a semiplastic condition.

As earlier described, however, such coolers themselves have, in the past, caused adverse air currents in the zone of sheet formation and for that reason have not proven entirely satisfactory. The cooler of the present invention eliminates these adverse air currents by preventing the atmosphere within the drawing chamber from coming into contact with its cool surface, while at the same time leaving its ability to absorb heat from the sheet by radiation practically unimpaired.

Figure 2:
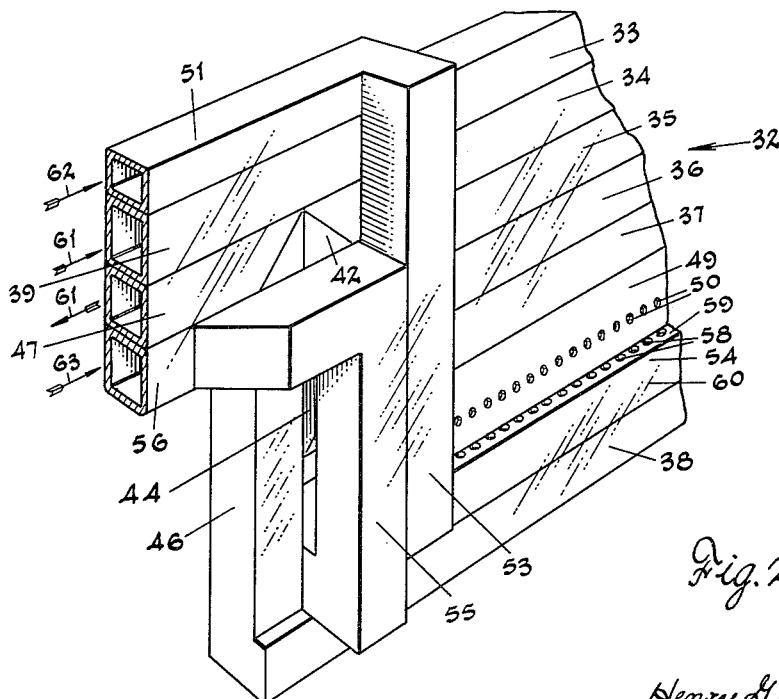
FIG. 2 is a fragmentary perspective view showing one end of a sheet cooler with arrows indicating the direction of flow of fluids entering and leaving the cooler.

Specifically, in accordance with a preferred form of the present invention the sheet coolers 32 include a vertical bank of elongated conduits 33, 34, 35, 36, 37 and 38 interconnected so as to permit circulation of a heat absorbing medium therethrough. As will be evident in FIGS. 2 and 3, the conduits 33, 34, 35, 36 and 37 are positioned in side-by-side relation one above the other within the drawing chamber, while the lowermost conduit 38 extends parallel thereto but spaced some distance from the next lowermost conduit for a purpose to be later described. It will be understood that the coolers facing either surface of the sheet are identical in all respects except that one is made for right hand operation while the other is made for left hand operation to thereby simplify the connection of the coolers to the sources of cooling medium. Thus, only one cooler will be described in detail herein.

To connect the cooling medium conduits to a source of cooling medium, the conduit 33 has an inlet extension 39 which extends through the sidewall of the drawing chamber and is provided with a coupling 40 at its end. The cooling medium enters the conduit 33 through the extension 39 and absorbs heat from the sheet during its passage across the cooling chamber. The conduit 33 extends beyond the opposite side wall of the drawing chamber for some distance where it is connected to the conduit 34 by an elbow 41. The cooling medium then flows back through the drawing chamber in conduit 34, again absorbing heat from the sheet. Another elbow 42 connects the conduit 34 to the next lower conduit 35. The cooling medium continues to circulate back and forth across the drawing chamber through conduit 35, elbow 43 joining the conduits 35 and 36, another elbow 44 joining the conduits 36 and 37, and thence into a tube 45 which connects the conduit 37 with the lowermost conduit 38. At its opposite end, the conduit 38 discharges the cooling medium into a vertical connecting conduit 46 which carries it to an effluent line 47 running parallel to the extension 39. The effluent line may be connected through a coupling 48 to any suitable system (not shown) for either disposing of the cooling medium or cooling it for recirculation through the conduits.

Thus the cooling medium enters through the inlet extension 39 of conduit 33, circulates through the entire system, and is discharged through the effluent line 47 after having absorbed a sufficient amount of heat from the glass sheet to cause the sheet to set in its final form. It will be understood, of course, that where temperature conditions warrant or where it is desired to maintain an even more rigid control over the temperature of the sheet, the conduits 33, 34, 35, 36, 37 and 38 may be individually supplied with the cooling medium, as from a manifold (not shown), so that the cooling medium will travel across the drawing chamber only once. Such an arrangement permits the cooling rate of the sheet to be controlled somewhat more accurately.

For the purpose of providing an upwardly moving layer of hot combustion gases adjacent the surfaces of the sheet coolers opposite the sheet, there is positioned beneath the conduit 37 and in the plane of the cooling medium conduits a gas manifold 49 having a row of spaced burner jets 50 facing the vertically rising sheet adjacent thereto. A combustible gas is slowly fed into the gas manifold from either of its ends through gas lines 51 having unions 52 at their outer end for connecting the manifold to a gas supply through suitable pressure control valves (not shown). Offset conduits 53 connect the gas lines to the manifold at their other end. Thus, the combustible gas enters from either end of the gas manifold so that the gas pressure may be maintained more nearly constant entirely across the manifold. As the gas is discharged through the burner jets 50 it ignites, thus creating a source of heated gases of combustion. The burner jets 50 are so positioned in the gas manifold as to create a continuous flame across the drawing chamber, and thus a continuous sheet or layer of the gases of combustion is created which will drift upwardly from the flames at the jets due to the buoyancy of the gases. It has been found that if left to drift upwardly due to their own buoyancy, however, the gases tend to stray from the surface of the cooling medium conduits, thus permitting air to contact the conduits and form a cool boundary layer which further disturbs the upward flow of hot gases. It has been found further that the volume of air removed from the space between the cooler and the sheet to support combustion of the gas at the jets 50 creates undesirable air currents near the meniscus which are liable to disturb the newly formed sheet.

To overcome these undesirable effects, there is located between the lowermost cooling medium conduit 38 and the gas manifold in the present invention an air manifold 54, connected through duct 55, air conduits 56 and connections 57 at either of its ends to a supply of air under pressure. As will best be seen in FIG. 5, the air manifold 54 and the lowermost conduit 38 are somewhat wider than the gas manifold and the remainder of the cooling medium conduits for a purpose to be hereinafter described. By positioning cooling medium conduit 38 between the surface 29 of the molten glass and the air and gas manifolds 49 and 54, respectively, heat from the molten bath is absorbed by the cooling medium, thus preventing the manifolds from becoming overheated to the extent that they might be caused to crack or warp.

The air manifold has a plurality of holes 58 in its upper wall 59 for discharging streams of air upwardly past the burner jets 50 in the gas manifold and in close proximity to the face of the cooler. The holes 58 of the preferred embodiment of the invention are aligned with the jets 50 of the gas manifold although it will be understood that under certain conditions, it may be desirable to employ a greater number of holes 58 in the air manifold than jets 50 in the gas manifold, or to offset the holes from the burner jets so as to provide an uninterrupted blanket of gases over the surface of the cooler. In addition, the edges of the holes 58 are flush with the surface of the gas manifold and cooling medium conduits so that the air discharged through the air manifold will be directed upwardly closely adjacent the surface of the cooler.

Figure 9:
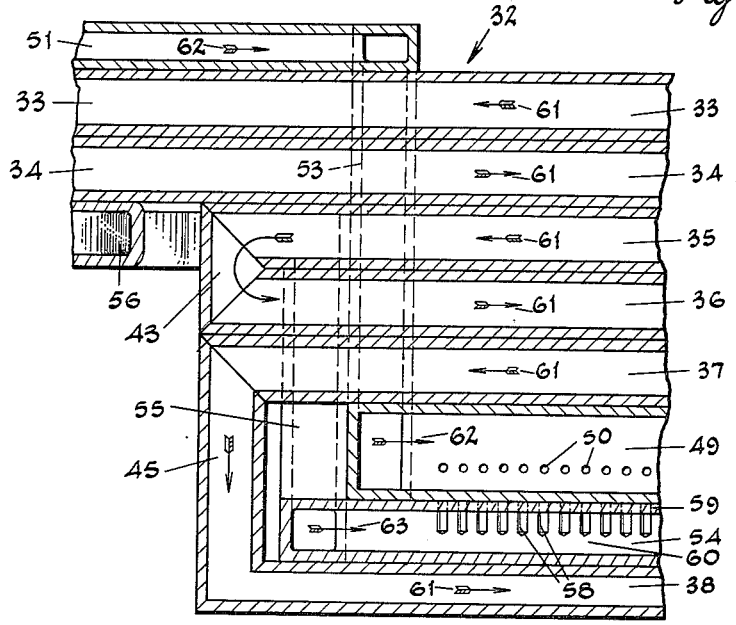
FIG. 9 is a fragmentary sectional view taken substantially on line 9—9 of FIG. 8, illustrating the flow within the cooler.

The holes 58 have been shown in FIGS. 5 and 9 as extending into the forward wall 60 of the air manifold in order that the overall thickness of the cooler may be held to a minimum. However, it will be understood that where desired, the air manifold may be extended toward the sheet so that the holes in the upper wall 59 thereof may be made flush with the gas manifold without drilling into the forward wall of the air manifold.

Figure 7:
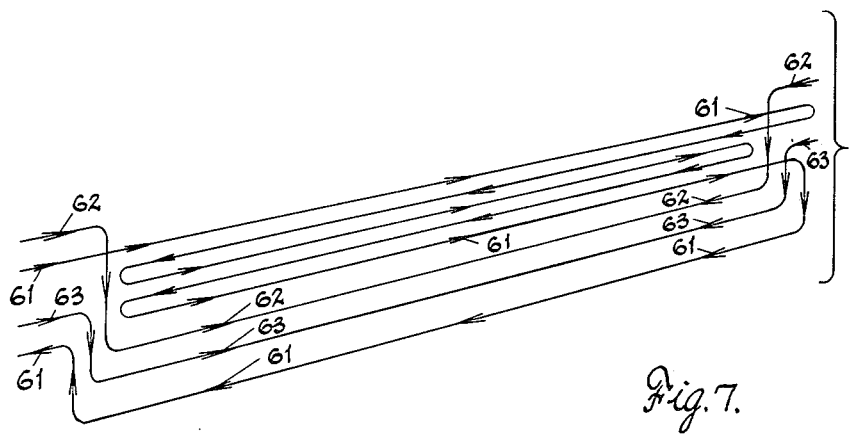
FIG. 7 is a flow diagram showing the direction in which the air, gas and cooling medium flow within the conduits of the cooler.
Figure 8:
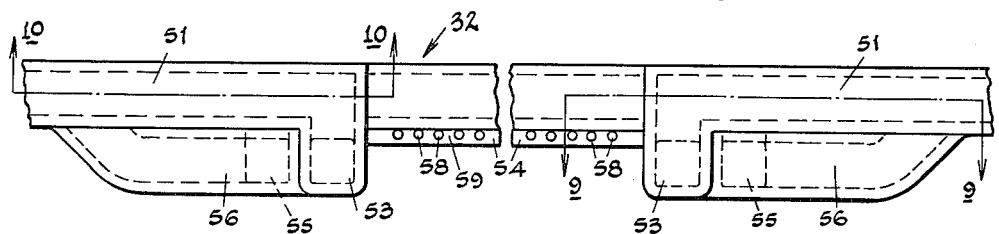
FIG. 8 is a fragmentary plan view of the sheet cooler assembly.

As shown in the flow diagram of FIG. 7, the cooling medium enters the cooler and flows through the interconnected cooling medium conduits along the path indicated by the arrows designated by the numeral 61. Combustible gas enters from each end through the gas lines 51 at the top of the cooler and flows in the direction of arrows designated by the numeral 62 to the gas manifold 49. The air enters from each end of the cooler and flows along the path indicated by arrows designated by the numeral 63 to the air manifold 54 where it is discharged through the holes 58 to flow upwardly past the gas manifold and the cooling medium conduits in the aforedescribed manner.

Reviewing briefly the operation of the invention, the cool surfaces of the cooling medium conduits 33 through 37 tend to create a boundary layer of cool air adjacent thereto. As the air cools, it moves downwardly toward the meniscus from which the sheet is being drawn where, unless retarded, it will come in contact with the viscous glass and cause thickness variations in the sheet. To prevent formation of this cool boundary layer adjacent the coolers, the present invention directs a layer of heated combustion gases upwardly over the surface of the cooling medium conduits from the gas manifold 49. Thus, combustible gases are discharged through the burner jets 50 into the atmosphere adjacent the cooler. At the same time, air is directed gently upwardly past the gas manifold and along the surface of the cooler from the holes 58 of the air manifold. The air mixes with the combustible gases and the mixture ignites in a continuously burning flame to provide a source of heated gases of combustion. It will be seen that the air emitted from the air manifold serves both to support the combustion of the gases discharged through the jets 50 and to cause the hot gases resulting from the flames at the jets to drift gently upward past the cooling medium conduits in a thin blanket. By properly adjusting the pressure within the manifolds 49 and 54, the blanket of hot gases can be caused to remain closely adjacent the surface of the cooling medium conduits, thereby preventing air from contacting the conduits to initiate the undesirable convection currents earlier described. It has been found that this thin blanket of hot gases, while preventing air from contacting the surface of the cooler, is practically transparent to heat radiated by the sheet, and thus the cooler still performs its function of reducing the temperature of the sheet.

The cooling medium conduit 38 is near enough to the surface 29 of the molten glass so that no undesirable air currents caused by a cool boundary layer formed thereabout will disturb the meniscus. However, it will be understood that the conduit 38 may be omitted and the air manifold placed adjacent the surface of the molten glass where operating conditions warrant.

It is to be understood that the form of the invention herewith shown and described is to be taken as an illustrative embodiment only of the same, and that various changes in the shape, size and arrangement of parts, as well as various procedural changes may be resorted to without departing from the spirit of the invention.

We claim:

1. An apparatus for drawing sheet glass including a working receptacle for receiving a bath of molten glass and means for drawing a sheet from said bath, cooling means including a plurality of conduits positioned one above the other in a vertical plane above said bath at the opposite sides of the sheet and spaced therefrom, means for circulating a cooling medium through said conduits for absorbing heat from said sheet by radiation, a plurality of burner jets disposed across the lower portion of said cooling means, and means for discharging air upwardly past said burner jets whereby the gases of combustion from said burner jets are caused to sweep across the faces of said coolers opposite said sheet to prevent the formation of a cool boundary layer of air adjacent said faces.

2. An apparatus for drawing sheet glass, including a working receptacle for receiving a bath of molten glass and means for drawing a sheet upwardly from said bath, cooling means located above said bath at opposite sides of the sheet and spaced therefrom for absorbing heat from said sheet by radiation thereto, and means for directing an upward flow of hot gases across the faces of said cooling means opposite said sheet, said last-named means including a plurality of burner jets disposed across the lower portion of said coolers and means for discharging air upwardly past said burner jets whereby the gases of combustion are caused to sweep upwardly across the faces of said coolers.

3. An apparatus for drawing sheet glass including a working receptacle for receiving a bath of molten glass and means for drawing a sheet from said bath, a plurality of interconnected conduits positioned one above the other in a vertical plane over said bath at the opposite sides of the sheet and spaced therefrom, means for circulating a cooling medium through said interconnected conduits for absorbing heat from said sheet by radiation, and means for directing a flow of hot gases upwardly along and in contact with the surfaces of said interconnected conduits opposite said sheet for preventing the formation of a cool boundary layer of air adjacent said surfaces, said last named means including a first manifold positioned below said conduits for receiving a continuous supply of combustible gases, a row of burner jets in the wall of said first manifold facing said sheet for discharging said combustible gases into the atmosphere, and means for directing air upwardly past said burner jets whereby the hot gases of combustion from said burner jets are caused to disperse over the surfaces of said conduits in a thin layer.

4. An apparatus for drawing sheet glass as claimed in claim 3, wherein said means for directing air upwardly includes a second manifold positioned below said first manifold for receiving a continuous supply of air under pressure, said second manifold extending outwardly beyond said first manifold in the direction of said sheet, and spaced openings in the upper wall of said second manifold for discharging said air.

5. An apparatus for drawing sheet glass as claimed in claim 4, wherein said spaced openings are positioned in a row across said second manifold, with the edge of the openings in said row flush with the outer surface of said first manifold.

6. An apparatus for drawing sheet glass as claimed in claim 4, including a cooling medium conduit positioned beneath said second manifold and between said second manifold and the surface of the molten bath.

7. An apparatus for drawing sheet glass including a working receptacle for receiving a bath of molten glass and means for drawing a sheet from said bath, a plurality of interconnected conduits positioned one above the other in a vertical plane over said bath at the opposite sides of the sheet and spaced therefrom, means for circulating a cooling medium through said interconnected conduits for absorbing heat from said sheet by radiation, a first manifold positioned beneath said conduits for receiving a continuous supply of combustible gases, a plurality of burner jets in the wall of said first manifold facing the sheet for discharging said combustible gases into the atmosphere, a second manifold positioned below said first manifold for receiving a continuous supply of air under pressure, said second manifold extending outwardly beyond the edge of said first manifold in the direction of said sheet, and spaced openings in the upper wall of said second manifold for directing air upwardly past said burner jets, whereby the hot gases of combustion from said burner jets are caused to flow upwardly along and in contact with the surfaces of said conduits for preventing the formation of a cool boundary layer of air adjacent said surfaces.

8. A method of producing sheet glass comprising, drawing a continuous sheet of glass from a mass of molten glass, removing heat from said sheet by radiation to coolers located opposite each surface of said sheet above the molten glass, discharging combustible gases in the direction of said sheet from the lower portion of said coolers, and directing streams of air upwardly past said discharging combustible gases and along the surfaces of said coolers to form a thin blanket of the hot gases of combustion over the surfaces of said coolers.

References Cited by the Examiner

UNITED STATES PATENTS 2,963,820  12/1960  Brichard _____ 65—204 X

FOREIGN PATENTS 550,858  9/1956  Belgium.

DONALL H. SYLVESTER, *Primary Examiner.*